2 Sheets—Sheet 1.

F. RIMPLER.
POTATO-DIGGER.

No. 177,008. Patented May 2, 1876.

Fig. 1.

Witnesses.
Ford C. Dietrich
J. Wm. Master

Inventor:
Ferdinand Rimpler
Per Lafayette Bingham & Co
Attorneys.

2 Sheets—Sheet 2.

F. RIMPLER.
POTATO-DIGGER.

No. 177,008. Patented May 2, 1876.

Witnesses.

Inventor
Ferdinand Rimpler
Per La Fayette Bingham & Co
Attorneys.

UNITED STATES PATENT OFFICE.

FERDINAND RIMPLER, OF PLYMOUTH, INDIANA.

IMPROVEMENT IN POTATO-DIGGERS.

Specification forming part of Letters Patent No. 177,008, dated May 2, 1876; application filed March 25, 1876.

*To all whom it may concern:*

Be it known that I, FERDINAND RIMPLER, of Plymouth, in the county of Marshall and State of Indiana, have invented certain new and useful Improvements in Potato Diggers and Gatherers; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 2:
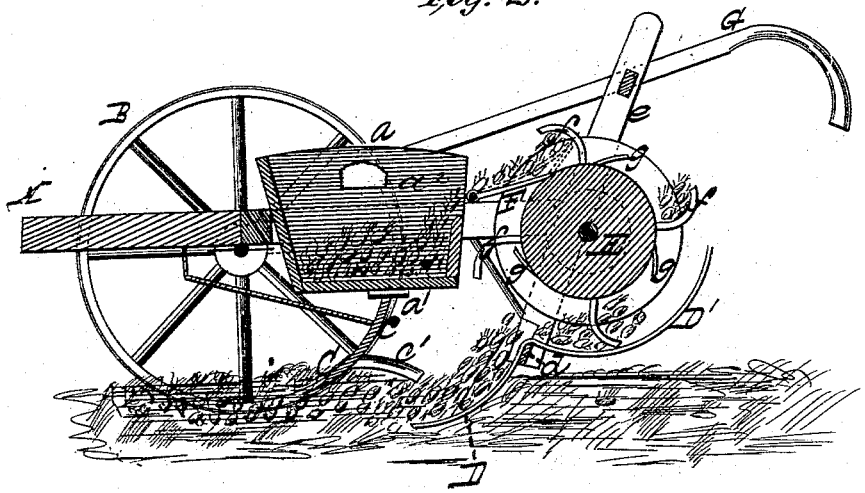
Figure 3:
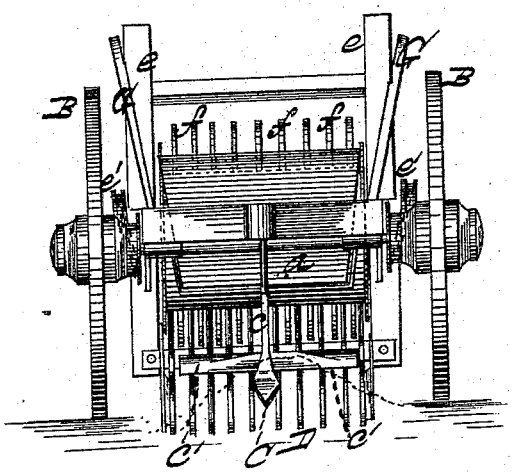

Figure 1, Sheet 1, is a plan view of my improved potato digger and gatherer. Fig. 2, Sheet 2, is a vertical section through the dotted line $x\,x$ of Fig. 1; and Fig. 3, same sheet, is a front elevation of the same.

Corresponding parts in the several figures are designated by like letters.

This invention relates to a certain improvement in potato diggers and gatherers combined; and it consists of the construction of the digger and basket, and of the combination, with the elevating-cylinder having a series of curved radial teeth, of a vibrating apron or shaker, substantially as hereinafter more fully set forth.

In the annexed drawings, A refers to a frame of suitable construction, upon which is mounted a receptacle, $a$, to receive the potatoes while being elevated from the digger. The receptacle $a$ rests in a metallic or other stirrup, $a^1$, to permit of its detachability by its handles $a^2$ therefrom, to empty it when full, &c. The stirrup $a^1$ is fastened to the lower side of the frame A, itself mounted at its forward end upon wheels B B. From the stirrup $a^1$ extends downwardly the plow-standard $c$, which may be cast therewith, and which is provided with the shovel C, to loosen or plough the ground, and having the extended wings or knives $c'\,c'$ concaved or curved longitudinally, to provide a double cutting edge or surface to remove the vines, &c., with facility. D D is the digger, consisting of a series of parallel bars or wires, suitably curved to enter the ground and take up the potatoes, from whence they—the latter—are emptied into the basket D' D', a continuation of the wires or bars of the digger, and shaped to conform to the curvature of a segment of the elevating-cylinder E. At the point where the digger and basket unite they are secured, in any known way, to, or cast with, a transverse bar, $d$, by which, with the assistance of screws or other fastenings, they are secured in place to the standards or uprights $e\,e$ of the frame A. The elevating-cylinder E is journaled in the uprights $e\,e$, and provided upon the projecting ends of the axis with pulleys $e^1\,e^1$, around and from which extend endless belts or shafts $e^2\,e^2$, to and around the grooved hubs or pulleys of the driving and transporting wheels B B, for rotating or revolving the said cylinder. The cylinder E is provided with a series of peripherical curved teeth, $f\,f$, arranged thereon in isolated rows, and reaching through the spaces between the bars or wires of the basket D' D', to take the potatoes therefrom and empty them upon the vibrating apron or shaker F, which, after shaking the adhering dirt from the potatoes, precipitates or empties them into the receptacle $a$, which may be removed when full and its contents disposed of, and returned to its place to be again filled, and so on. The vibrating apron or shaker F consists of a series of fingers or bars extending at right angles, and attached to an axis journaled in the frame A, and in close proximity with the receptacle $a$, the spaces between the said fingers or bars being sufficiently wide to permit of the passage of the peripherical or radial teeth of the elevating-cylinder E, to avoid interference with the movement of the latter, and to receive the contents of its teeth, to be delivered into the receptacle $a$. The apron or shaker F receives its vibratory motion by being struck by projections or cams $g\,g$ upon the elevating-cylinder E. Handles G G are provided to the machine to guide and control it.

Having thus described my invention, what I claim, and desire to secure by Letters Patent, is—

The digger and basket D D', in combination with the toothed elevating-cylinder E, having the projections or cams $g\,g$, and vibrating apron or shaker F, substantially as and for the purpose set forth.

In testimony that I claim the foregoing as my own invention I affix my signature in presence of two witnesses.

FERDINAND RIMPLER.

Witnesses:
  JAS. A. GILMORE,
  GIDEON BLAIN.